United States Patent
Korus et al.

(10) Patent No.: US 10,810,293 B2
(45) Date of Patent: Oct. 20, 2020

(54) METHOD AND APPARATUS FOR DYNAMICALLY ADJUSTING BIOMETRIC USER AUTHENTICATION FOR ACCESSING A COMMUNICATION DEVICE

(71) Applicant: MOTOROLA SOLUTIONS, INC, Chicago, IL (US)

(72) Inventors: Michael F Korus, Eden Prairie, MN (US); Melanie King, Hollywood, FL (US); Daniel A. Tealdi, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 262 days.

(21) Appl. No.: 16/161,205

(22) Filed: Oct. 16, 2018

(65) Prior Publication Data

US 2020/0117781 A1    Apr. 16, 2020

(51) Int. Cl.
| | | |
|---|---|---|
| *H04L 29/06* | (2006.01) | |
| *G06F 21/00* | (2013.01) | |
| *G06F 21/32* | (2013.01) | |
| *G06N 20/00* | (2019.01) | |
| *G06K 9/62* | (2006.01) | |
| *G10L 15/01* | (2013.01) | |
| *H04L 9/32* | (2006.01) | |
| *H04W 12/06* | (2009.01) | |
| *H04W 12/08* | (2009.01) | |

(52) U.S. Cl.
CPC ........... *G06F 21/32* (2013.01); *G06K 9/6277* (2013.01); *G06N 20/00* (2019.01); *G10L 15/01* (2013.01); *G06K 9/6262* (2013.01); *H04L 9/3231* (2013.01); *H04W 12/06* (2013.01); *H04W 12/08* (2013.01)

(58) Field of Classification Search
CPC ..... G06K 9/6277; G06F 21/316; G06F 21/32; G06N 20/00; H04W 12/005; H04W 12/08; H04W 12/06; H04W 4/10; G10L 15/01; H04L 9/3231; H04L 9/6262
USPC ......................................................... 726/17
See application file for complete search history.

(56) References Cited

U.S. PATENT DOCUMENTS 9,589,560 B1    3/2017  vitaladevuni et al.
2004/0148526 A1  7/2004  Sands et al.
(Continued)

FOREIGN PATENT DOCUMENTS

EP    3076320 A1   10/2016

OTHER PUBLICATIONS

The International Search Report and the Written Opinion corresponding serial No. PCT/US2019/054480 filed Oct. 3, 2019, dated Dec. 13, 2019 all pages.

*Primary Examiner* — Haresh N Patel
(74) *Attorney, Agent, or Firm* — Barbara R. Doutre

(57) ABSTRACT

Improved user authentication of a communication device is provided by expanding voice biometric authentication with a dynamically updated user profile formed of non-voice usage parameters. The non-voice usage parameters are collected during successful voice authentications to establish non-voice compensation controls. When a failed voice biometric authentication attempt is followed by a valid PIN entry, then a false rejection is determined, and a voice biometric threshold is adjusted to reduce the individual user-based false rejection rate along with the enablement of the non-voice usage controls.

20 Claims, 2 Drawing Sheets

(56) References Cited

U.S. PATENT DOCUMENTS

| | | | |
|---|---|---|---|
| 2005/0193118 A1* | 9/2005 | Le | H04L 65/1069 709/227 |
| 2010/0106502 A1* | 4/2010 | Farrell | G10L 17/00 704/246 |
| 2014/0100829 A1* | 4/2014 | Mould | G16H 50/50 703/2 |
| 2014/0123248 A1* | 5/2014 | Balakrishnan | G06F 21/31 726/5 |
| 2014/0144722 A1* | 5/2014 | Lee | B32B 5/022 181/290 |
| 2014/0164582 A1* | 6/2014 | Dawson | H04W 48/18 709/221 |
| 2014/0313007 A1* | 10/2014 | Harding | G07C 9/37 340/5.52 |
| 2014/0365068 A1* | 12/2014 | Burns | G10L 13/033 701/31.5 |
| 2015/0161370 A1* | 6/2015 | North | G06F 21/32 726/5 |
| 2016/0054977 A1* | 2/2016 | Gritton | G06F 3/167 345/156 |
| 2016/0063397 A1 | 3/2016 | Ylipaavalniemi et al. | |
| 2016/0197916 A1 | 7/2016 | Ravindran et al. | |
| 2016/0227411 A1* | 8/2016 | Lundblade | G06F 21/31 |
| 2017/0070606 A1* | 3/2017 | Bandyopadhyay | G06F 1/1643 |
| 2017/0116767 A1* | 4/2017 | Jaffrain | G06T 11/20 |
| 2017/0148028 A1* | 5/2017 | White-Ellul | G06Q 20/32 |
| 2017/0212917 A1* | 7/2017 | Chiesa | G06Q 50/01 |
| 2017/0232887 A1* | 8/2017 | Clontz | B60N 2/002 340/457 |
| 2017/0249003 A1* | 8/2017 | Nonogaki | G06F 21/32 |
| 2017/0300678 A1 | 10/2017 | Metke et al. | |
| 2018/0109520 A1* | 4/2018 | Han | G06F 21/45 |
| 2019/0145740 A1* | 5/2019 | Czerski | F41H 1/02 2/463 |
| 2019/0246896 A1* | 8/2019 | Hernandez-Castaneda | A61B 3/028 |
| 2019/0324260 A1* | 10/2019 | Hamilton | G02B 23/10 |
| 2020/0049455 A1* | 2/2020 | Hamilton | G02B 27/18 |
| 2020/0076621 A1* | 3/2020 | Lesso | G06F 21/57 |

\* cited by examiner

METHOD AND APPARATUS FOR DYNAMICALLY ADJUSTING BIOMETRIC USER AUTHENTICATION FOR ACCESSING A COMMUNICATION DEVICE

FIELD OF THE INVENTION

The present invention relates to user authentication of a communication device and more particularly to reducing and compensating for false rejections in communication devices that utilize biometric authentication for communication device access.

BACKGROUND

Communication systems, such as public safety communication systems, have had limited opportunity to take full advantage of biometric user authentication. There are several challenges to biometric user authentication including difficulty in developing reliable biometric matching thresholds that can be applied across a population of users. Users of public safety devices, for example users of portable two-way radios, seek to reliably access public safety services, such as command central services and push-to-talk (PTT) services, using their voice. However, for a small percentage of users, false rejections may be encountered when voice biometrics are used. These false rejections may equate to a poor user experience. From a user experience perspective, it is therefore important to minimize the occurrence of false rejections by valid users. From a systems standpoint, it is also important that security be maintained to ensure that only valid users are accessing the public safety services.

Accordingly, there is a need for improving user authentication of a communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
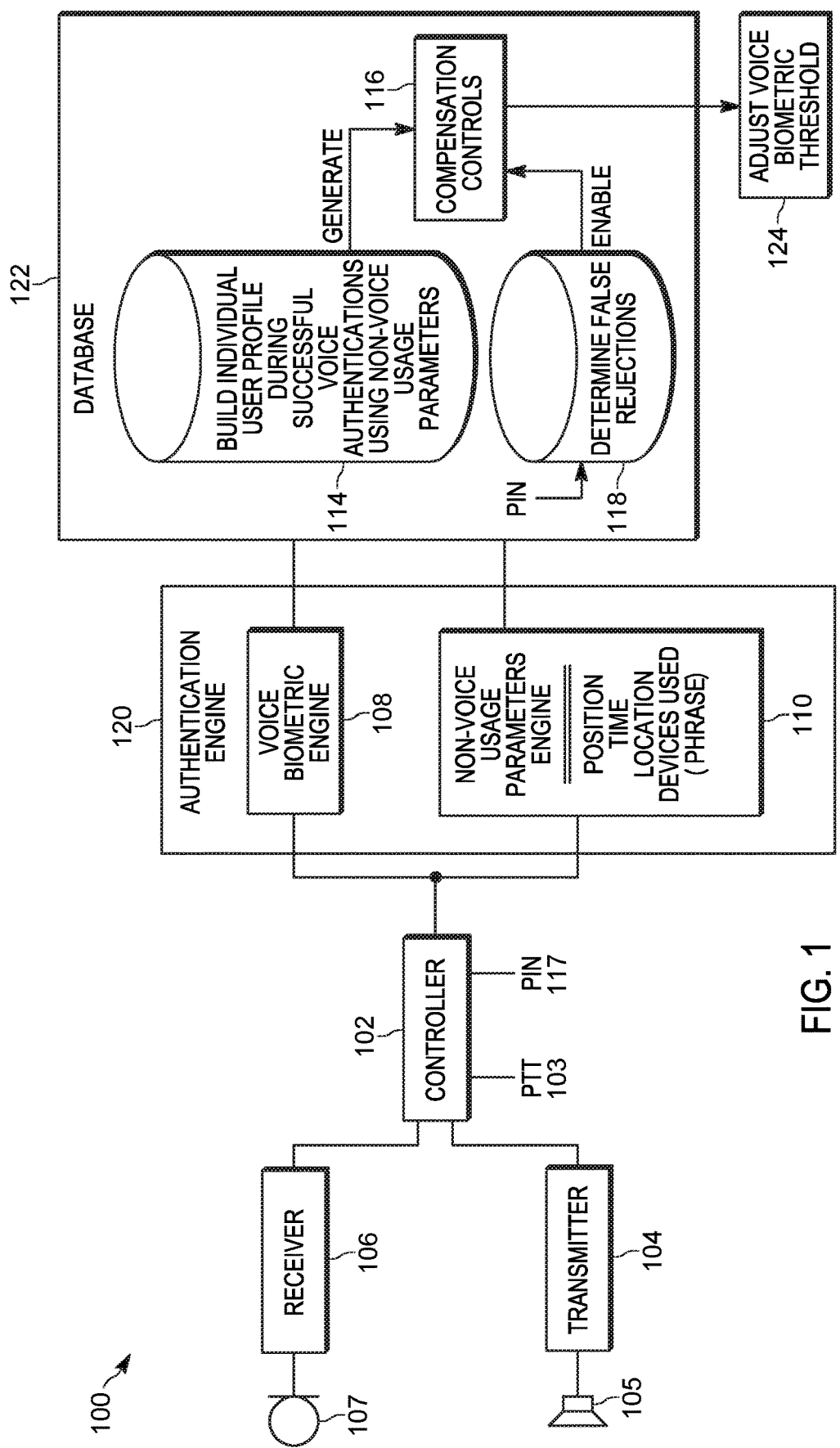
FIG. 1 is a block diagram of a communication device formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an improved user authentication of a communication device by expanding voice biometric authentication with a dynamically updated user profile formed of non-voice usage parameters. The non-voice usage parameters are collected during successful voice authentications to establish non-voice compensation controls. When a failed voice biometric authentication attempt is followed by a valid PIN entry, then a false rejection is determined, and a voice biometric threshold is adjusted to reduce the individual user-based false rejection rate along with the enablement of the non-voice usage controls.

For the purposes of this application, the false rejection being addressed is a false rejection that occurs as a result of a legitimate user with a clean authentication sample being falsely rejected. For example, the user may provide a clean authentication sample but the trill or cadence of the user's voice is unable to be properly detected by the communication device, thereby resulting in a false rejection. The approach purposely discounts valid rejections which may occur to a legitimate user as a result of a noisy authentication sample being rejected. For example, a user who has spoken too softly or who has spoken in a noisy environment, thereby failing to provide a clean authentication sample, would still be considered a valid rejection.

FIG. 1 is a block diagram of a communication device 100 formed and operating in accordance with some embodiments. The communication device 100 is preferably a public safety communication device operating within a public safety communication system, such as law enforcement or fire rescue. Public safety personnel (for example, police officers, fire fighters, first responders, investigators, and the like) use such devices to communicate with one another as well as with command central services during the performance of their duties. The communication device is preferably a portable device, such as for example, a handheld radio, body worn remote speaker microphone (RSM), and/or a broadband smartphone with public safety application access. Communication device 100 comprises a controller 102, a transmitter 104, and a receiver 106 all communicatively coupled to provide communications via a speaker 105 and a microphone 107. Such communications may comprise two-way, half-duplex communications via a push-to-talk (PTT) button 103 for PTT functionality operating within a public safety system and/or full-duplex broadband, long term evolution (LTE) or WiFi operating over a public safety network.

In accordance with some embodiments, the communication device 100 further comprises an authentication engine 120 providing both a voice biometric engine 108 and a non-voice usage parameter engine 110. Authentication engine 120 is operatively coupled to a database 122. In accordance with some embodiments, the database 122 is used to build an individual user profile 114. In accordance with the embodiments, the individual user profile 114 is built during successful voice authentications using non-voice usage parameters which are gathered by non-voice usage parameter engine 110. The non-voice usage parameters monitored by non-voice usage parameter engine 110 and collected within the individual user profile 114 are used to generate compensation controls 116. The user profile 114 of non-voice usage parameters and the generation of non-voice usage parameter compensation controls 116 are dynamically updated during each valid voice authentication process.

To describe operation of the device 100 in more detail, a user-originated voice input to the microphone 107 is received at receiver 106 and processed at controller 102 thereby providing a voice biometric input to a voice biometric engine 108 of the authentication engine 120. The voice biometric engine 108 verifies the validity of a user through voice authentication, also referred to as audio authentication. The voice biometric engine 108 compares the voice biometric input to a voice biometric matching threshold to determine either a successful user authentication or an unsuccessful user authentication. Biometric based voice authentication consists of both physiological biometric components produced by the vocal tract (e.g., voice tone and pitch) and behavioral components related to the voice (e.g., accent, cadence, pronunciation). Together these physiological and behavioral voice factors combine to produce unique voice patterns, making voice very useful in biometric authentication. Voice biometrics are captured through the microphone 107, and the characteristics are determined through the use of specialized biometric algorithms of voice biometric engine 108 that implement voice specific feature extraction and analysis functions. A user of device 100 trains (enrolls) their voice biometric during a registration process resulting in an enrolled voice template. During an authentication event, the user supplies a second voice sample (e.g., via the microphone 107) which is processed by the biometric algorithm of voice biometric engine 108 and compared to the enrolled template. The match threshold determines how similar the authentication voice sample matches the enrolled voice template. In accordance with the embodiments, the communication device 100 improves the user authentication experience for user's who encounter false rejections of the voice biometric threshold, through no fault of their own, through the combination of lowering the voice biometric threshold and the application of the compensation controls 116 learned through the building of the non-voice usage parameters user profile.

In accordance with the embodiments, the non-voice usage parameters which are used for compensation controls 116 are measured by the non-voice usage parameters engine 110. The compensation controls comprise at least one non-voice usage parameter. Non-voice usage parameters may comprise, for example, position of the device on the body (shoulder, chest and/or orientation in the hand), spacing of the microphone from the user's mouth, location (e.g. vehicle, home, office) of the communication device during an authentication attempt, time of day (time stamp) of the authentication attempt, determination of mixed device usage (e.g. radio used in conjunction with RSM). The communication device 100 may comprise sensors, such as an accelerometer, a gyroscope, GPS, proximity sensor, temperature sensor, lighting sensor, altitude sensor, and radar for determining and monitoring the non-voice usage parameters.

In accordance with the embodiments, if a user is experiencing a false rejection rate (FRR) above a public safety (PS) population norm, then the user is verified by the non-voice usage parameter profile, followed by a lowering of the biometric threshold for that verified user.

In some embodiments, a valid PIN entry 117 may also be provided by the user when the user fails voice authentication. The valid PIN entry may be counted as a false voice rejection 118 within database 122. The PIN entry 117 may be numeric or alpha-numeric or some other symbols, and may even be a predetermined spoken phrase. The PIN entry 117 may be made to the device 100 via a keypad (hard keypad or soft keypad), knob with numbering, lettering, or other symbols, or microphone with "voiced in PIN" (using voice to text). Timers may be used to determine that the valid user PIN entry is entered within a predetermined timeframe to ensure security. The user who fails voice authentication, may enter the valid PIN 117 to the device 100, which in turn allows for a determination of user experience issues with voice biometrics (abnormally high false rejection rate). If there is a determination of a voice biometric user experience issue not related to improper device usage or hardware/software issues, then non-voice usage parameter compensation controls 116 can be enabled after lowering of the voice biometric match threshold. Entry of an invalid PIN results in a valid authentication failure and prevents the enablement of the non-voice usage parameter compensation controls 116.

Hence, communication device 100 may be securely authenticated using a voice biometric (for most users), or for the case of the few users who encounter false rejections of voice authentication, the communication device may be authenticated through the combination of lowered biometric threshold and compensation controls. The user of the communication device 100 is thus advantageously provided with an improved user authentication experience for the individual valid user that has an associated false rejection rate that falls outside of the public safety population norm.

Figure 2:
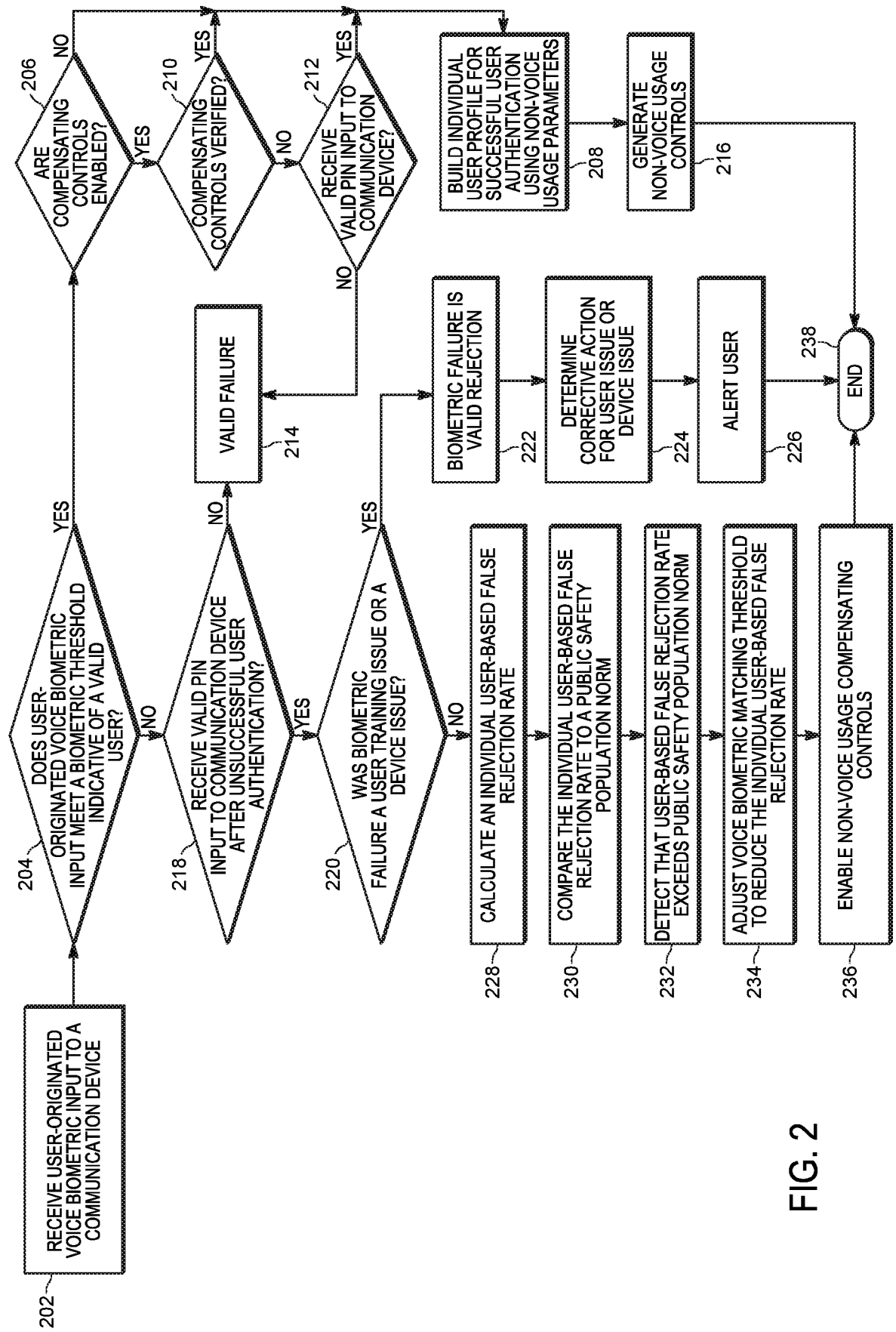
FIG. 2 is a flowchart of a method for adjusting user authentication for accessing a communication device in accordance with some embodiments.

FIG. 2 is a method 200 for adjusting user authentication for accessing a communication device in accordance with some embodiments. Method 200 provides an improved user experience by providing a dynamically personalized authentication for an individual who, although being a valid user, fails user authentication verification. The method 200 begins at 202 by receiving a user-originated voice biometric input to the communication device, followed at 204 by determining whether the user-originated voice biometric input meets a voice biometric matching threshold indicative of a successful user authentication. If the user-originated voice biometric input meets the voice biometric matching threshold at 204, then a determination of non-voice usage compensating controls (referred to as compensating controls hereafter) enablement is performed at 206. If compensating controls are not enabled at 206, then an individual user profile of successful user authentications is built at 208. This represents a normal successful user authentication flow.

However if compensating controls are enabled at 206, then the method continues to 210 where compensating control verification is performed. If compensating control verification is successful at 210 then an individual user profile of successful user authentications is built at 208. This represents a user flow in which the user's biometric match threshold had been lowered to improve the user experience while maintaining security by enabling compensating controls.

If compensating control verification fails at 210 then a check is made for a valid PIN entry at 212 indicative of a valid user. If a valid PIN is made within a predetermined amount of time at the communication device at 212 then an individual user profile of successful user authentications is built at 208. This case represents, for example, a user-to-device interaction that is good enough to pass voice biometric, but yet fails non-voice parameter compensating controls such as location, time, altitude, or device orientation. This may represent a profile that is still in a learning phase or adapting to a new user behavior that is being added to an individual user profile of successful user authentication.

If a valid PIN entry is not received at 212, or is not received within the predetermined amount of time, a valid rejection is detected at 214. This represents the case where a user passed voice biometric via a lowered biometric threshold but then failed compensating controls to further authenticate the user, including a PIN entry failure.

Hence, the individual user profile is built at 208 using non-voice usage parameters which are then used for generating non-voice usage compensation controls at 216. The generation of non-voice usage compensation controls during a valid voice authentication advantageously provides a check and balance that can be enabled if later false rejections occur.

Examples of non-voice usage parameters may comprise but are not limited to, location, time of day, and phrase entry (voice to text), spacing of microphone from the user's mouth, positioning of the communication device upon a user's shoulder, chest and/or orientation of the device in the users hand to name a few. The non-voice usage parameter of location, as previously described, may take into consideration operation of the device within a vehicle, home, office, or other location.

If the user voice authentication was deemed unsuccessful at 204 (i.e. the user-originated voice biometric input did not meet the voice biometric matching threshold), then a check is made for a valid PIN entry indicative of a valid user at 218. Such entry is preferably made within a predetermined amount of time. If a valid PIN entry is not received at 218, or is not received within the predetermined amount of time, a valid rejection is detected at 214.

Upon receipt of a valid PIN entry at 218, a false rejection is determined. The determination of a valid false rejection, via valid PIN entry at 218, is further verified at step 220 by determining whether the failed biometric attempt was a result of human error (e.g., training issue) or device error. This can be determined, for example, by comparing the current non-voice usage parameters with the learned non-voice usage parameters (built back at 208), such as device orientation of the user.

If the comparison of the current non-voice usage parameters with the learned non-voice usage parameters cannot be verified at 220, then the biometric failure is considered to be a valid biometric rejection at 222, and corrective action for the user issue and/or device issue can be determined at 224. An alert may then be sent at 226 (via audio, display other otherwise) to indicate the basis for the valid biometric failure to the user along with the recommended corrective action. For example, the user alert may provide an indication of the need for training in appropriate usage of the device or may alert the user to a need for device servicing.

If the failed biometric attempt was not a result of human error (e.g., training issue) or device error as verified at 220, then the method 200 moves to 228 by calculating an individual user based false rejection rate. In accordance with the embodiments, the individual user based false rejection rate is calculated based on the number of false rejections incurred by the user. The user based false rejection rate calculation deliberately does not include valid rejections caused by incorrect/delayed PIN entry, or user error, or device error thereby providing for a customized user-based false rejection rate.

A comparison is made at 230 of the individual user-based false rejection rate to a known public safety population norm. If the method detects that the individual user-based false rejection rate exceeds that of the public safety population norm at 232, then an adjustment is made to the voice biometric matching threshold (reducing the voice biometric threshold) which will in turn result in a reduction of the user-based false rejection rate at 234. The method then enables the non-voice usage compensation controls at 236. Hence, valid users who previously failed voice biometric authentication through no fault of their own can now be authenticated using voice biometrics without reducing security by enabling passive compensating controls not impacting the user experience. The method ends at 238, but can return to receive the next user originated voice biometric input at 202 which allows for the further development of the user profile.

In some embodiments, the method 200 may further comprise an optional step (not shown) comprising verifying an authentication phrase, after a valid PIN entry at 218 and biometric failure rejection verification at step 220. The usage parameter of phrase entry verification is limited to speech recognition, and as such is not attempting to biometrically identify a user, but rather verifies that the spoken words match the same spoken words captured during enrollment. Phrase verification fails when the spoken words do not match (e.g., voice to text service).

The continued development of the individual user profile and compensation controls encompassing non-voice usage parameters during valid voice authentications beneficially ensures that false rejections are reduced for valid individuals, thereby providing an improved user experience in authenticating a communication device. Such improved individualized authentication is particularly advantageous to valid users of public safety radios operating in public safety systems, who previously failed authentication through no fault of their own, while maintaining security to the overall system.

Unlike systems that merely lower a biometric matching threshold across all users which lowers the overall security to the device, the approaches provided by the embodiments focus on the problem users. As mentioned previously, problem users may represent only small percentage of users impacted by a high rate of false rejections. Additionally, the approach provided by the embodiments goes beyond mere default to a PIN entry after a biometric false rejection in that the approach detects and compensates for the false rejection using non-voice usage parameters reflective of the user's operating conditions. Accordingly, there has been provided a method and apparatus for dynamically adjusting user authentication of a communication device. The embodiments provide for an improved user experience by blending compensation controls and voice-authentication threshold adjustments to keep false rejections in check.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device, comprising:
    an authentication engine receiving a user-originated voice biometric input and determining one of:
        a successful user authentication based on a voice biometric matching threshold; and
        an unsuccessful user authentication based on the voice biometric matching threshold;
    a database for building an individual user profile based on successful user authentications, the individual user profile comprising non-voice usage parameters collected during successful user authentications, the database generating non-voice usage compensation controls based on the non-voice usage parameters collected during successful user authentications;
    the authentication engine is further operable to receive a valid user PIN entry, indicative of a valid user, and to further determine false rejections and valid rejections; and
    the authentication engine, subsequent to the detection of a false rejection, adjusting the voice biometric matching threshold and enabling the non-voice usage compensation controls, thereby improving user authentication for a valid user having an individual false rejection rate that falls outside of a public safety population norm.

2. The communication device of claim 1, further comprising a timer for determining that the valid user PIN entry is entered within a predetermined time of the unsuccessful user authentication.

3. The communication device of claim 1, wherein adjusting the voice biometric matching threshold comprises decreasing the voice biometric matching threshold to decrease the individual false rejection rate.

4. The communication device of claim 1, wherein the non-voice usage parameters, comprise one or more of:
    time of communication device during an authentication attempt, location of communication device during an authentication attempt, position of communication device during an authentication attempt, microphone positioning relative to a user during an authentication attempt, mixed device usage during an authentication attempt, and phrase verification.

5. The communication device of claim 1, wherein detection of a valid rejection by the authentication engine further comprises determining whether the valid rejection is user based or device based.

6. The communication device of claim 5, wherein:
    the communication device sends a user alert to indicate a need for user training of the device in response to the valid rejection being user based; and
    the communication device sends a user alert to indicate a need for device servicing in response to the valid rejection being device based.

7. The communication device of claim 1, wherein the authentication engine utilizes a plurality of sensors that determine the non-voice usage parameters.

8. The communication device of claim 7, wherein the sensors that determine non-voice usage parameters comprise at least one of:
    an accelerometer;
    a gyroscope;
    global positioning system (GPS);
    a proximity sensor;

a temperature sensor;
a lighting sensor;
an altitude sensor; and
radar.

9. The communication device of claim 1, wherein the communication device provides push-to-talk (PTT) functionality operating within a public safety system.

10. The communication device of claim 1, wherein the communication device is a public safety communication device operating within a public safety system.

11. The communication device of claim 1, wherein receipt of entry of an invalid PIN results in a valid authentication failure and prevents the enablement of the non-voice usage compensation controls.

12. A method for adjusting user authentication for accessing a communication device, comprising:
   receiving a user-originated voice biometric input to the communication device that meets a voice biometric matching threshold indicative of a successful user authentication;
   building an individual user profile of non-voice usage parameters collected during the successful user authentication;
   generating non-voice usage compensation controls based on the of non-voice usage parameters collected during the successful user authentication;
   receiving a user-originated voice biometric input to the communication device that fails the voice biometric matching threshold indicative of an unsuccessful user authentication;
   receiving a valid PIN entry, indicative of a valid user, to the communication device after the unsuccessful user authentication;
   calculating an individual user-based false rejection rate in response to the valid PIN entry;
   comparing the user-based false rejection rate to a public safety population norm;
   detecting that the user-based false rejection rate exceeds that of the public safety population norm;
   adjusting the voice biometric matching threshold to reduce the individual user-based false rejection rate; and
   enabling the non-voice usage compensation controls.

13. The method of claim 12, wherein adjusting the biometric matching threshold comprises:
   decreasing the voice biometric matching threshold.

14. The method of claim 12, further comprising:
   verifying an authentication phrase after receiving the valid PIN entry.

15. The method of claim 12, wherein the non-voice usage parameters, comprise one or more of:
   time of communication device usage, location of communication device usage, position of communication device during usage, microphone positioning relative to a user, mixed device usage, and phrase verification.

16. The method of claim 12, further comprising:
   detecting a valid biometric rejection; and
   determining whether the valid biometric rejection is user based or device based.

17. The method of claim 16, further comprising:
   sending a user alert to indicate a need for user training of the device in response to the valid biometric rejection being user based; and
   sending a user alert to indicate a need for device servicing in response to the valid biometric rejection being device based.

18. The method of claim 12, further comprising:
   enabling user access to public safety services via the communication device in response to verification of the user's current non-voice usage parameters against the non-voice usage compensation controls and the adjusted voice biometric matching threshold being decreased.

19. The method of claim 18, wherein the public safety services comprise push-to-talk services.

20. The method of claim 18, wherein the public safety services comprise command central services.

* * * * *